(12) United States Patent
Main et al.

(10) Patent No.: US 10,519,642 B2
(45) Date of Patent: Dec. 31, 2019

(54) ADJUSTABLE SENSOR DEVICE FOR A PLUMBING FIXTURE

(71) Applicant: Masco Canada Limited, St. Thomas (CA)

(72) Inventors: Brian David Main, Woodstock (CA); Bryan Fisher, Appin (CA)

(73) Assignee: Masco Canada Limited, St. Thomas (CA)

( * ) Notice: Subject to any disclaimer, the term of this patent is extended or adjusted under 35 U.S.C. 154(b) by 9 days.

(21) Appl. No.: 15/927,545

(22) Filed: Mar. 21, 2018

(65) Prior Publication Data

US 2018/0313073 A1    Nov. 1, 2018

Related U.S. Application Data

(60) Provisional application No. 62/490,267, filed on Apr. 26, 2017.

(51) Int. Cl.
| | |
|---|---|
| *F16K 31/02* | (2006.01) |
| *E03D 5/10* | (2006.01) |
| *E03C 1/05* | (2006.01) |
| *E03D 3/06* | (2006.01) |
| *H04Q 9/00* | (2006.01) |

(52) U.S. Cl.
CPC .............. *E03D 5/105* (2013.01); *E03C 1/057* (2013.01); *E03D 3/06* (2013.01); *F16K 31/02* (2013.01); *H04Q 9/00* (2013.01); *H04Q 2209/40* (2013.01)

(58) Field of Classification Search
CPC ......... E03C 1/057; E03D 5/105; F16K 31/02; Y10T 137/9464; B60Q 1/0683
See application file for complete search history.

(56) References Cited

U.S. PATENT DOCUMENTS

| | | | |
|---|---|---|---|
| 4,672,206 A | 6/1987 | Suzuki et al. | |
| 4,728,785 A | 3/1988 | Ohnuki et al. | |
| 5,074,520 A * | 12/1991 | Lee ......................... | E03C 1/057 251/129.04 |
| 5,927,313 A | 7/1999 | Hart | |
| 6,082,407 A * | 7/2000 | Paterson ................... | E03C 1/04 137/801 |
| 6,219,857 B1 * | 4/2001 | Wu ....................... | G01D 11/245 250/338.1 |
| 6,376,840 B1 | 4/2002 | Ko | |
| 6,479,823 B1 | 11/2002 | Strang et al. | |
| 6,543,916 B2 | 4/2003 | Shirai | |
| 6,720,884 B2 | 4/2004 | O'Connor et al. | |
| 7,069,941 B2 * | 7/2006 | Parsons ..................... | E03C 1/05 137/1 |

(Continued)

*Primary Examiner* — Matthew W Jellett
(74) *Attorney, Agent, or Firm* — Reising Ethington, P.C.

(57) ABSTRACT

A sensing device for a plumbing fixture includes an electronics housing including a rear wall. The rear wall includes a tool passage therethrough and a fastener head pocket in communication with the tool passage. The device further includes a fastener including head carried in the fastener head pocket of the rear wall of the electronics housing and a body extending away from the head and establishing a fastener axis. The device further includes a sensor assembly including a sensor housing having a first portion coupled to the electronics housing and a second portion carried on the body of the fastener and configured for movement relative to the electronics housing along the body of the fastener.

20 Claims, 6 Drawing Sheets

(56) References Cited

U.S. PATENT DOCUMENTS

| | | | | |
|---|---|---|---|---|
| 7,156,363 | B2 * | 1/2007 | Parsons | E03C 1/057 251/129.06 |
| 7,320,146 | B2 * | 1/2008 | Nortier | E03D 5/105 200/343 |
| 7,396,000 | B2 | 7/2008 | Parsons et al. | |
| 7,627,909 | B2 * | 12/2009 | Esche | E03C 1/057 251/129.04 |
| 7,731,154 | B2 | 6/2010 | Parsons et al. | |
| 7,743,438 | B2 * | 6/2010 | Chen | E03C 1/057 137/801 |
| 7,777,188 | B2 | 8/2010 | Fest et al. | |
| 7,921,480 | B2 | 4/2011 | Parsons et al. | |
| 7,997,301 | B2 * | 8/2011 | Marty | E03C 1/0404 137/613 |
| 8,021,465 | B2 | 9/2011 | Hilberer | |
| 8,152,135 | B2 | 4/2012 | Maercovich | |
| 8,154,412 | B2 | 4/2012 | Verdiramo | |
| 8,171,578 | B2 | 5/2012 | Tsujita et al. | |
| 8,181,289 | B2 | 5/2012 | Schmitt et al. | |
| 8,239,981 | B2 | 8/2012 | Epp et al. | |
| 8,250,680 | B2 * | 8/2012 | Murata | E03D 5/105 251/129.04 |
| 8,276,878 | B2 | 10/2012 | Parsons et al. | |
| 8,292,258 | B2 | 10/2012 | Mercovich et al. | |
| 8,296,875 | B2 | 10/2012 | Loberger et al. | |
| 8,348,229 | B2 | 1/2013 | Burns | |
| 8,365,767 | B2 | 2/2013 | Davidson et al. | |
| 8,376,313 | B2 | 2/2013 | Burke et al. | |
| 8,381,329 | B2 | 2/2013 | Bayley et al. | |
| 8,384,032 | B2 | 2/2013 | Chen et al. | |
| 8,407,827 | B1 | 4/2013 | Friedman et al. | |
| 8,418,993 | B2 | 4/2013 | Chen | |
| 8,421,020 | B2 * | 4/2013 | Chen | E03C 1/057 250/353 |
| 8,424,569 | B2 | 4/2013 | Marty et al. | |
| 8,438,672 | B2 | 5/2013 | Reeder et al. | |
| 8,448,271 | B2 | 5/2013 | Rudisser | |
| 8,469,056 | B2 | 6/2013 | Marty et al. | |
| 8,479,765 | B1 | 7/2013 | Wren | |
| 8,496,025 | B2 | 7/2013 | Parsons et al. | |
| 8,516,628 | B2 | 8/2013 | Conroy | |
| 8,528,579 | B2 | 9/2013 | Jonte et al. | |
| 8,549,677 | B2 | 10/2013 | Weigen et al. | |
| 8,561,626 | B2 | 10/2013 | Sawaski et al. | |
| 8,572,772 | B2 | 11/2013 | Wolf et al. | |
| 8,576,032 | B2 | 11/2013 | Herbert et al. | |
| 8,590,072 | B2 | 11/2013 | Brunner et al. | |
| 8,612,057 | B2 | 12/2013 | Murata et al. | |
| 8,613,419 | B2 | 12/2013 | Rodenbeck et al. | |
| 8,639,651 | B2 | 1/2014 | Beitelmal et al. | |
| 8,727,843 | B2 | 5/2014 | McReynolds | |
| 8,744,631 | B2 | 6/2014 | Wang et al. | |
| 8,776,817 | B2 | 7/2014 | Sawaski et al. | |
| 8,807,521 | B2 | 8/2014 | Dunki-Jacobs et al. | |
| 8,827,239 | B2 | 9/2014 | Chen | |
| 8,827,240 | B2 | 9/2014 | Chen | |
| 8,844,564 | B2 | 9/2014 | Jonte et al. | |
| 8,857,786 | B2 | 10/2014 | Bayley et al. | |
| 8,863,774 | B2 | 10/2014 | Wang | |
| 8,882,572 | B2 | 11/2014 | McReynolds | |
| 8,887,323 | B2 | 11/2014 | Oberholzer et al. | |
| 8,926,148 | B2 | 1/2015 | Shumate et al. | |
| 8,939,429 | B2 | 1/2015 | Sawask et al. | |
| RE45,373 | E | 2/2015 | Allen, Jr. et al. | |
| 8,944,105 | B2 | 2/2015 | Rodenbeck et al. | |
| 8,950,019 | B2 | 2/2015 | Loberger et al. | |
| 8,950,426 | B2 | 2/2015 | Yewdall et al. | |
| 8,950,730 | B2 | 2/2015 | Bedolla et al. | |
| 8,955,822 | B2 | 2/2015 | Parsons et al. | |
| 8,973,612 | B2 | 3/2015 | Sawaski et al. | |
| 8,984,679 | B2 | 3/2015 | Bayley et al. | |
| 8,992,049 | B2 | 3/2015 | McDade et al. | |
| 8,997,270 | B2 | 4/2015 | Murata et al. | |
| 9,010,337 | B2 | 4/2015 | Kobal | |
| 9,032,565 | B2 | 5/2015 | Loeck et al. | |
| 9,169,626 | B2 | 10/2015 | Guler et al. | |
| 9,170,148 | B2 * | 10/2015 | Bayley | G01F 23/363 |
| 9,496,308 | B2 | 11/2016 | Haddad et al. | |
| 9,574,336 | B1 * | 2/2017 | Maercovich | E03D 5/105 |
| 2006/0124885 | A1 | 6/2006 | Irizar Igarzabal | |
| 2011/0228544 | A1 | 9/2011 | Dubord | |

* cited by examiner

ADJUSTABLE SENSOR DEVICE FOR A PLUMBING FIXTURE

BACKGROUND a. Field

This disclosure relates generally to sensors used in plumbing fixtures to detect the presence of a person or another object. More specifically, this disclosure pertains to a sensing device that enables angular adjustment of the sensor to reduce or eliminate false positives created by reflective surfaces proximate the plumbing fixture.

b. Background Art

Many modern plumbing fixtures including kitchen and bathroom sinks, urinals and toilets include a sensor that indicates the presence of a person or another object in order to start or stop the flow of water. For example, sensors are employed in automatic flushometers (also referred to as hands-free or touchless flushometers) to control delivery of fluid to a toilet bowl or urinal from a fluid supply line. The sensor generates a signal that is used by the flushometer to determine when to flush the toilet. The sensors used in modern plumbing fixtures commonly employ an emitter that emits an electromagnetic wave (e.g., an infrared wave) and a receiver that detects a reflection of the wave to determine whether a person or another object is present and/or the distance to the person or object. Reflective surfaces disposed near the fixture—including, for example, stainless steel stalls or trough sinks and mirrors—will also reflect waves emitted by the emitter of the sensor. Depending on the location of the surfaces and the angle of inclination of the surfaces, waves that are reflected by such surfaces can falsely indicate that a person or another object is present and cause unintended activation of the fixture.

The inventors herein have recognized a need for a sensing device for a plumbing fixture that will overcome one or more of the above-identified deficiencies.

BRIEF SUMMARY

A sensing device for a plumbing fixture is provided. In particular, a sensing device is provided that enables angular adjustment of the sensor to reduce or eliminate false positives created by reflective surfaces proximate the plumbing fixture.

A sensing device for a plumbing fixture in accordance with one embodiment includes an electronics housing including a rear wall. The rear wall includes a tool passage therethrough and a fastener head pocket in communication with the tool passage. The device further includes a fastener including a head carried in the fastener head pocket of the rear wall of the electronics housing and a body extending away from the head and establishing a fastener axis. The device further includes a sensor assembly including a sensor housing having a first portion coupled to the electronics housing and a second portion carried on the body of the fastener and configured for movement relative to the electronics housing along the body of the fastener.

A sensing device for a plumbing fixture in accordance with another embodiment includes an electronics housing including a rear wall and a sidewall extending away from the rear wall and establishing an interior. The rear wall includes a tool passage therethrough and a fastener head pocket in communication with the tool passage. The device further includes a fastener including a head carried in the fastener head pocket of the rear wall of the electronics housing and a threaded body extending away from the head and establishing a fastener axis. The device further includes a sensor assembly carried in the interior of the electronics housing and including a sensor housing having a first portion fixed relative to the electronics housing and a second portion carried on the threaded body of the fastener and configured for movement relative to the electronics housing along the threaded body of the fastener.

A flushometer assembly in accordance with one embodiment includes a valve body, a valve element disposed within the valve body and a solenoid configured to control a position of the valve element. The assembly further includes a sensing device including an electronics housing including a rear wall and a sidewall extending away from the rear wall and establishing an interior. The rear wall includes a tool passage therethrough and a fastener head pocket in communication with the tool passage. The sensing device further includes a fastener including a head carried in the fastener head pocket of the rear wall of the electronics housing and a threaded body extending away from the head and establishing a fastener axis. The sensing device further includes a sensor assembly carried in the interior of the electronics housing and including a sensor housing having a first portion fixed relative to the electronics housing and a second portion carried on the threaded body of the fastener and configured for movement relative to the electronics housing along the threaded body of the fastener. The assembly further includes a controller configured to control the solenoid responsive to an output signal of the sensor assembly.

The foregoing and other aspects, features, details, utilities, and advantages of the disclosed embodiments will be apparent from reading the following description and claims, and from reviewing the accompanying drawings.

DETAILED DESCRIPTION

Figure 1:
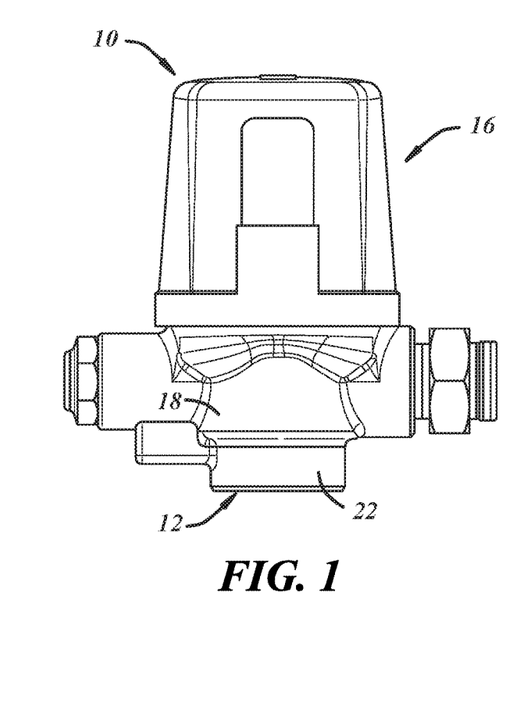
FIG. 1 is a plan view of an automatic flushometer assembly incorporating one embodiment of a sensing device in accordance with the present teachings.
Figure 2:
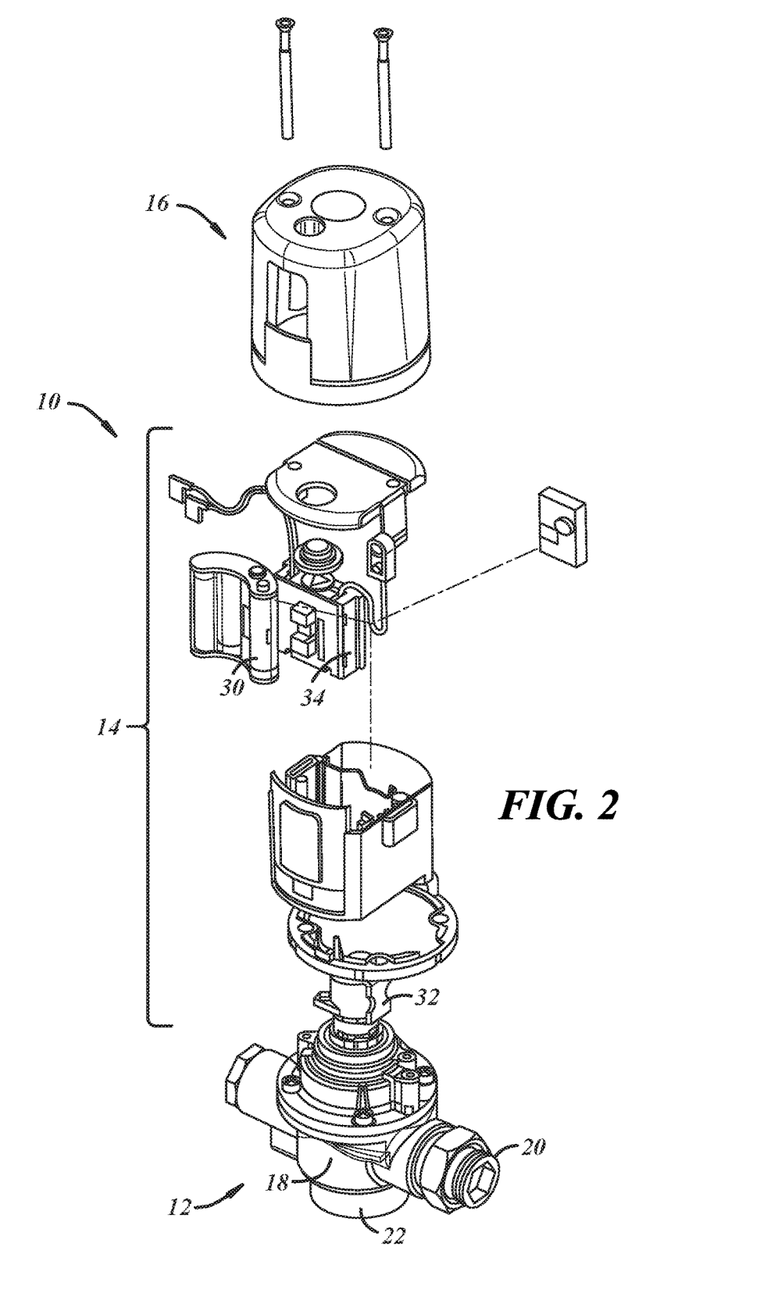
FIG. 2 is an exploded view of the assembly of FIG. 1.
Figure 3:
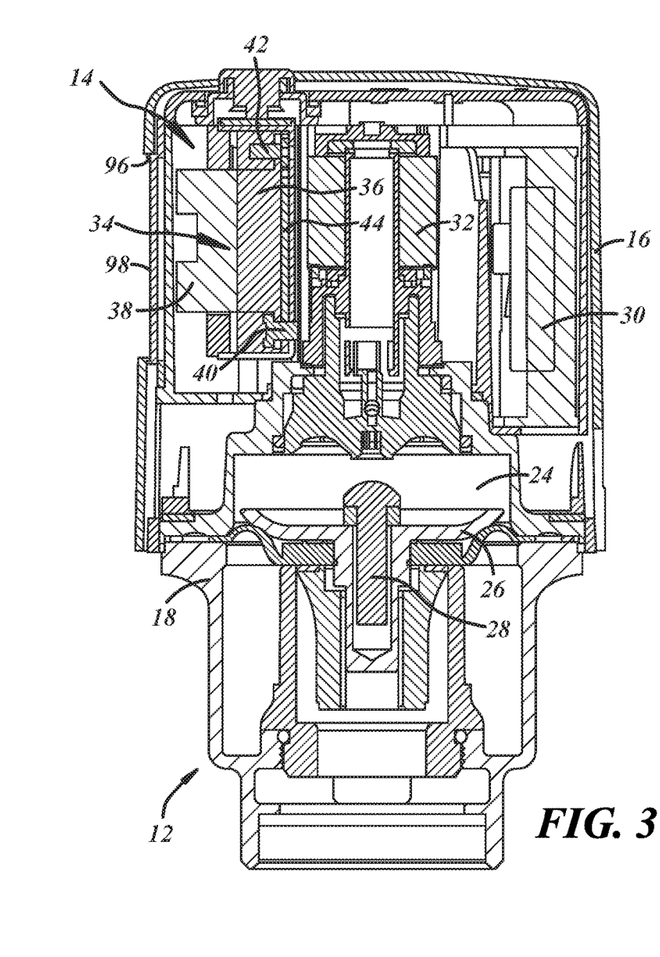
FIG. 3 is a cross-sectional view of the assembly of FIG. 1.

Referring now to the drawings wherein like reference numerals are used to identify identical components in the various views, FIGS. 1-3 illustrate an automatic flushometer assembly 10. Assembly 10 is used to control delivery of water or other fluids from a fluid supply line (not shown) to a sanitary fixture such as a toilet or urinal and, in particular, to the bowl of the toilet or urinal. In the illustrated embodiment, assembly 10 includes a flush valve assembly 12, a solenoid cap assembly 14 and a cover 16.

Flush valve assembly 12 controls delivery of water from the fluid supply line to the sanitary fixture. Referring to FIGS. 1-2, assembly 12 includes a valve body 18 that defines connections 20, 22 to the fluid supply line and fixture. Referring to FIG. 3, body 18 also defines a fluid chamber 24. A valve element such as a diaphragm 26 is disposed within valve body 18 and is normally seated so as to prevent fluid flow from either the fluid chamber 24 and/or the fluid supply line to the fixture. Solenoid cap assembly 14 assumes an open position to temporarily unseat diaphragm 26. Once unseated, fluid from chamber 24 drains into the fixture causing diaphragm 26 to rise and allowing fluid from the fluid supply line to flow into the fixture. A refill orifice allows fluid to flow into chamber 24 when the pressure is lower than the supply pressure. As long as the solenoid cap assembly 14 remains in an open position, the flow rate into chamber 24 is less than the flow rate out and chamber 24 continues to empty leaving diaphragm 26 in a fully open position. Once solenoid cap assembly 14 returns to a closed position, fluid flow into chamber 24 re-pressurizes chamber 24 and diaphragm 26 returns to a closed position based on a ratio of pressure and area above and below diaphragm 26. Pin 28 stops drainage from chamber 24 if solenoid cap assembly 14 remains in an open position when diaphragm 26 reaches its fully open position. The seat for pin 28 has a small bleed passage. Pin 28 blocks the draining of chamber 24 until the solenoid cap assembly 14 is closed and the pressure across pin 28 equalizes preventing run on condition. Although a particular structure for flush valve assembly 12 is shown in the illustrated embodiment, it should be understood that flush valve assembly 12 may be configured in a variety of ways.

Solenoid cap assembly 14 controls the state of flush valve assembly 12 and, in particular, the position of diaphragm 26 within valve body 18. Assembly 14 is mounted on valve body 18 of flush valve assembly 12 and may include a power source 30, a solenoid 32, and a sensing device 34 in accordance with one embodiment of the present teachings. Although a particular structure for assembly 14 is shown in the illustrated embodiment, it should again be understood that assembly 14 may be configured in a variety of ways.

Power source 30 provides current to electronic components such as solenoid 32 and sensing device 34 and a control circuit that transmits pulses to solenoid 32 responsive to signals from sensor 34. Power source 30 may comprise a battery that is disposed within cover 16. Alternatively, power source 30 may comprise a hardwire connection to, for example, a building power source.

Solenoid 32 opens and closes the pathway between chamber 24 and the fixture. Actuation of solenoid 32 is controlled by a control circuit in response to signals generated by sensing device 34. Sensing device 34 generates signals indicative of the presence of an object and the subsequent departure/absence of the object. Upon departure of the object, sensing device 34 outputs a signal that causes solenoid 32 to open and unseat diaphragm 26 to open flush valve assembly 12 and allow fluid flow to the fixture.

Sensing device 34 is provided to detect the presence of an object (e.g., a person) and to control solenoid 32 in response. Referring to FIGS. 4-8, sensing device 34 may include an electronics housing 36, a sensor assembly 38, fasteners 40, 42, a controller 44 and potting material 46. In accordance with one aspect of the present teachings, sensing device 34 is specifically configured to enable adjustment of the position and/or orientation of sensor assembly 38 in order to minimize or eliminate false positives from reflective surfaces disposed near flushometer assembly 10 such as stainless steel stalls and trough sinks and mirrors.

Figure 4:
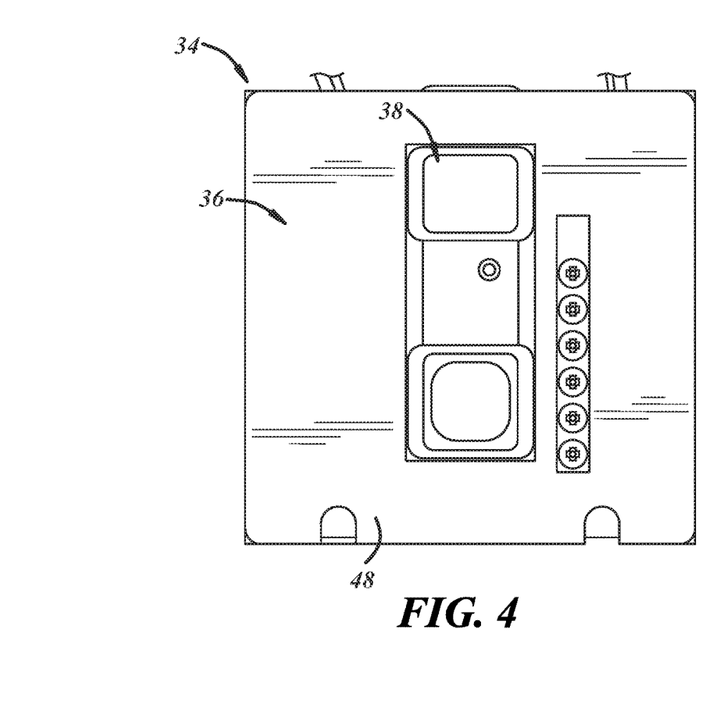
FIG. 4 is a plan view of a sensing device in accordance with one embodiment of the present teachings.
Figure 5:
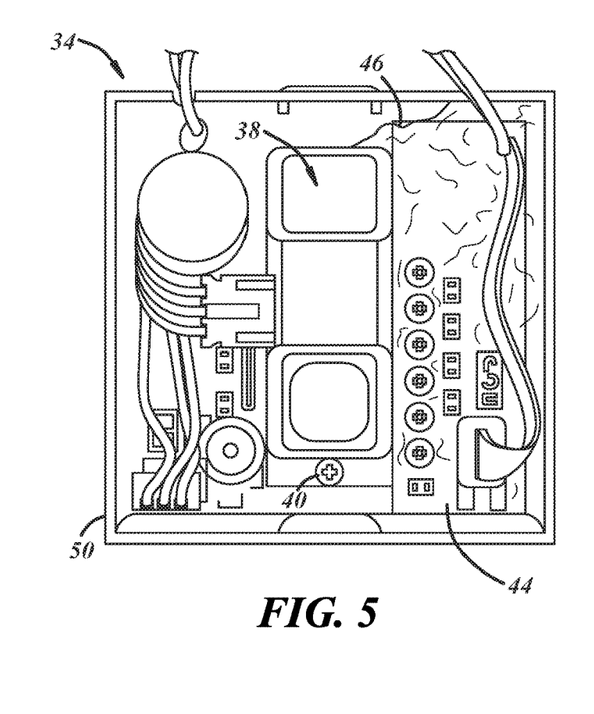
FIG. 5 is a plan view of the sensing device of FIG. 4 with a portion of the housing removed.
Figure 6:
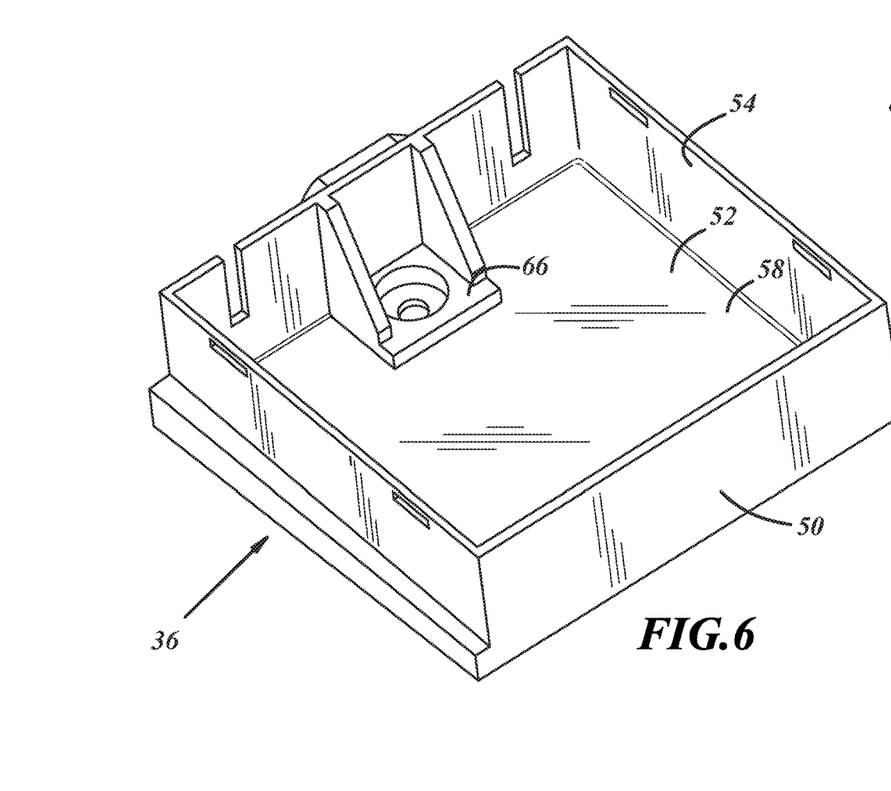
FIG. 6 is a perspective view of a portion of an electronics housing of the sensing device of FIG. 4.
Figure 8:
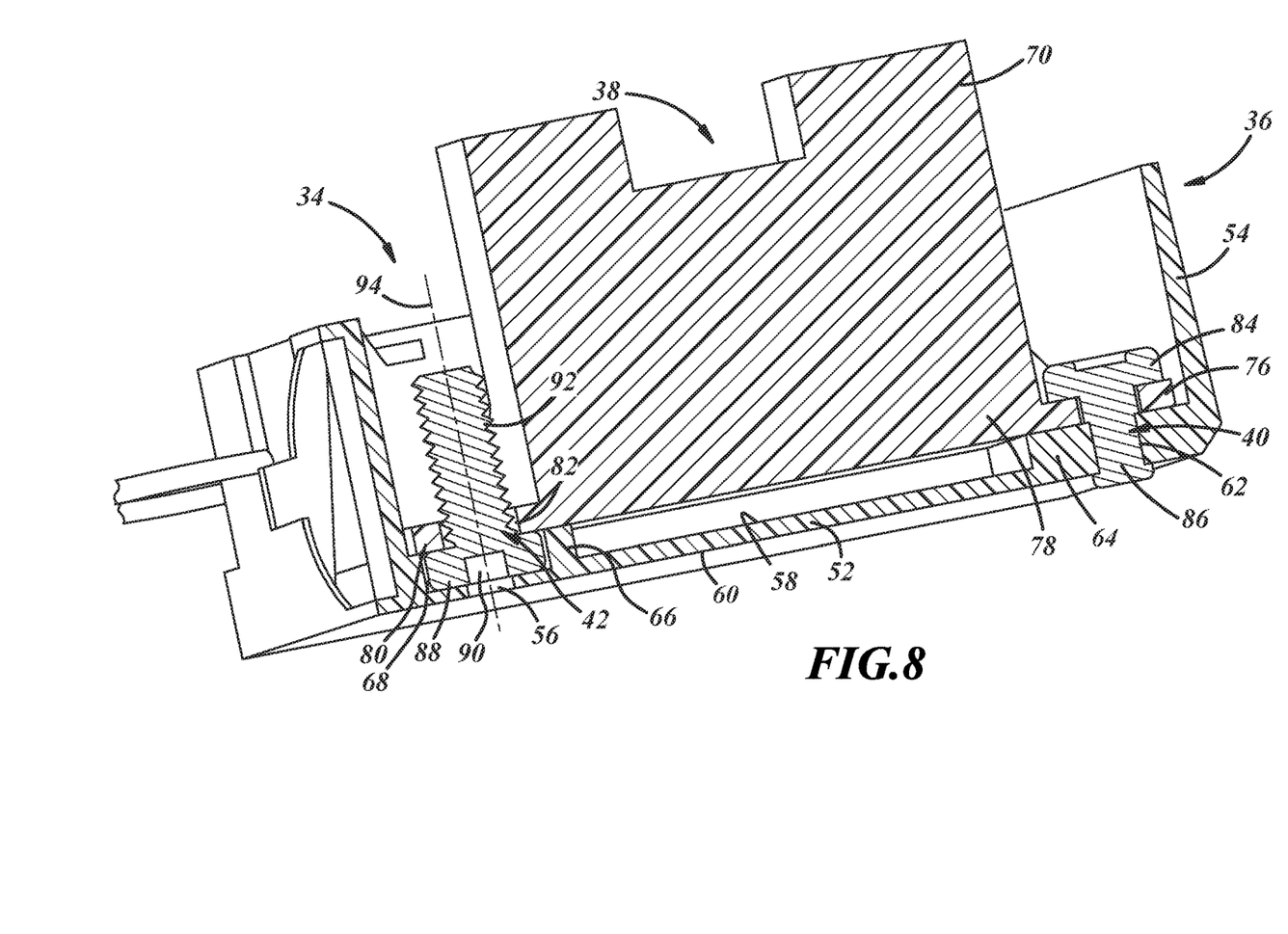
FIG. 8 is a cross-sectional view of the sensing device of FIG. 4.

Electronics housing 36 is provided to protect components of sensing device 34 from foreign objects and elements and to position and orient the components of sensing device 34. Housing 36 may include multiple members 48, 50 that may be coupled together using conventional fasteners such as screws, bolts, pins, welds or adhesives, through interlocking elements formed in members 48, 50 or through an interference fit. Referring to FIG. 4, member 48 forms a front wall of housing 36 and defines a generally rectangular aperture in the center through which sensor assembly 38 may extend. An adjacent aperture may provide a window to one or more light emitting diodes used to provide indicators of system settings and/or battery life. Referring to FIG. 6, member 50 forms a rear wall 52 of housing 36. Member 50 also forms a sidewall 54 that extends away from rear wall 52 towards the front wall defined by member 48 and defines an interior of housing 36. Referring to FIG. 8, rear wall 52 defines a tool passage 56 extending through rear wall 52 from an interior side 58 of wall 52 to an exterior side 60 of wall 52. Rear wall 52 may further define a fastener passage 62 extending through rear wall 52 from interior side 58 of wall 52 to an exterior side 60 of wall 52. Referring again to FIG. 6, interior side 58 of rear wall 52 may be substantially flat and configured to support controller 44. Referring again to FIG. 8, interior side 58 of rear wall 52 may also define a pair of raised flats 64, 66 configured to support sensor assembly 38 and through which fasteners 40, 42 may extend. Flat 66 defines a fastener head pocket 68 configured to receive a head of fastener 42 as discussed in greater detail below. Pocket 68 is in communication with tool passage 56 and pocket 68 and passage 56 may be centered on a common axis extending through passage 56 and pocket 68. Referring again to FIG. 6, sidewall 54 is generally rectilinear in shape in the illustrated embodiment, having two sets of parallel sides. One side of sidewall 54 may define passages through which wires or similar conductors may extend to couple controller 44 to power source 30 and solenoid 32.

Figure 7:
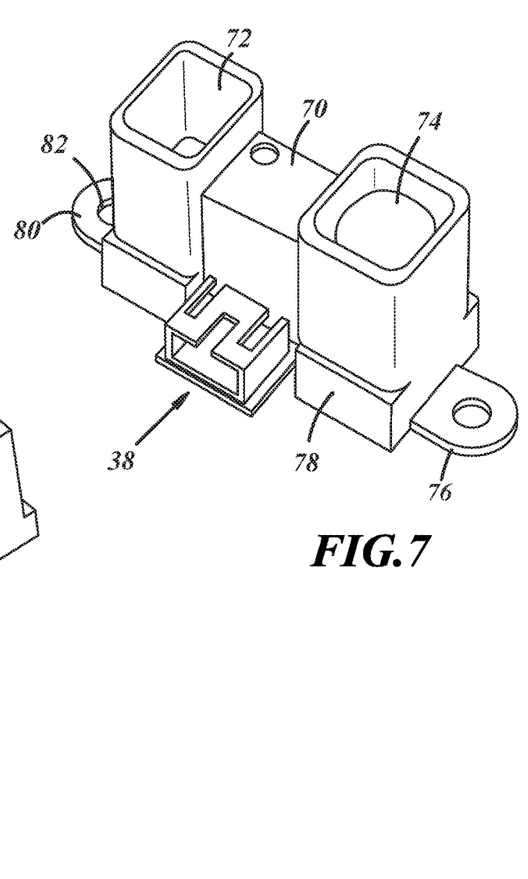
FIG. 7 is a perspective view of a sensor assembly of the sensing device of FIG. 4.

Sensor assembly 38 is provided to emit electromagnetic (and, in particular, infrared) waves and to receive and collect waves reflected by a person or another object. Assembly 38 is carried in the interior of electronics housing 36. Referring to FIG. 7, assembly 38 includes a sensor housing 70, an emitter 72 and a receiver 74.

Sensor housing 70 is provided to protect emitter 72, receiver 74 and related electronic components from foreign objects and elements and to position and to orient emitter 72, receiver 74 and the electronic components. Housing 70 may be made from a flexible material and may be made from an elastically deformable material for a purpose described below. In some embodiments, housing 70 may be made from polypropylene, acrylonitrile butadiene styrene (ABS) or other plastics. Housing 70 includes a portion that is coupled to electronics housing 36 and may be fixed in position relative to electronic housing 36. In particular, one portion of housing 70 may define a lower end flange 76 that extends from a body 78 of housing 70 and is configured to align with, and be supported on, flat 64 of rear wall 52 of electronics housing 36. Flange 76 defines a fastener passage configured for alignment with fastener passage 62 in rear wall 52 and through which fastener 40 may extend. Housing 70 includes another portion that is carried on a body of fastener 42 and is configured for movement relative to electronics housing 36 along the body of fastener 42. In particular, the portion may define an upper end flange 80 that extends from an opposite side of body 78 relative lower end flange 76 and is configured to align with, and be supported on, flat 66 of rear wall 52 of electronics housing 36. Flange 80 defines a fastener passage 82 through which fastener 42 may extend.

Emitter 72 is provided to generate and direct electromagnetic waves towards objects in the vicinity of flushometer assembly 10. Emitter 72 may comprise a light emitter such as light emitting diode configured to emit infrared light. Receiver 74 is provided to receive and collect electromagnetic waves reflected from objects in the vicinity of assembly 10. Receiver 74 may comprise one or more photodiodes configured to detect infrared light. Receiver 74 detects infrared light reflected by the presence of an object in the path of the emitted light and converts the light into an electrical charge thereby producing a signal indicative of the presence of the object and/or the relative distance of the object. A signal processing circuit converts the electrical charge into a signal corresponding to the presence of the object and/or distance of the object from the sensor assembly 38 and provides that signal to controller 44. Emitter 72 may be disposed proximate upper end flange 80 of sensor housing 70 while receiver 74 is disposed proximate lower end flange 76 of sensor housing 70.

Fastener 40 is provided to couple lower end flange 76 of sensor housing 70 to electronics housing 36. In particular, fastener 40 is provided to fix lower end flange 76 of sensor housing 70 to electronics housing 36 to prevent movement of flange 76 relative to electronics housing 36. Fastener 40 includes a head 84 that is positioned against flange 76 and a body 86 that extends through flange 76 and through rear wall 52 of electronics housing 36. Fastener 40 may comprise a screw. In embodiments including a fastener passage 62 in rear wall 52, passage 62 may be threaded and fastener 40 may be threaded through passage 62. In other embodiments, rear wall 52 may not include passage 62 and fastener 40 may comprise a self-tapping screw.

Figure 9A:
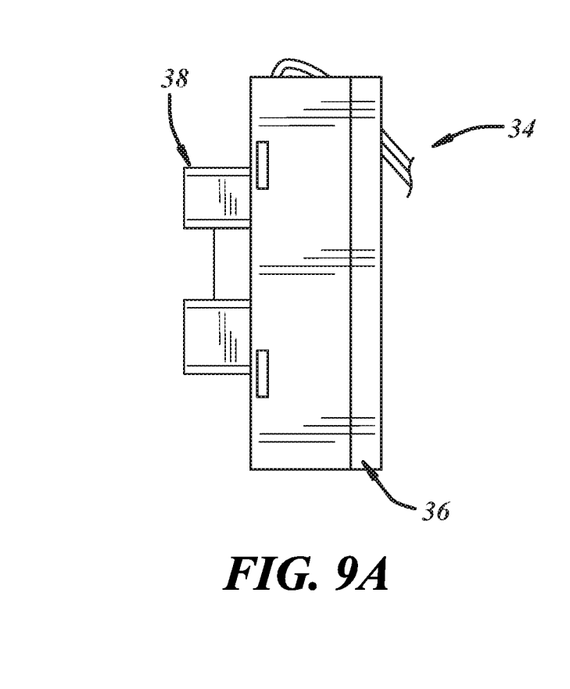
FIGS. 9A and 9B are side plan views of the sensing device of FIG. 4 illustrating adjustment of the sensor assembly of the sensing device.
Figure 9B:
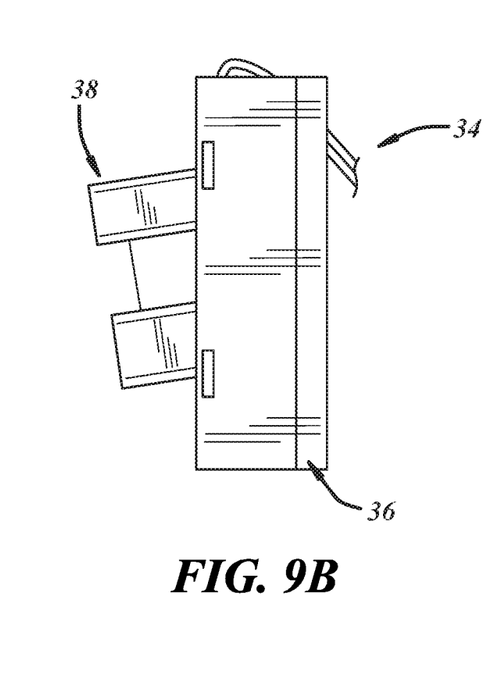

Fastener 42 is provided to couple upper end flange 80 of sensor housing 70 to electronics housing 36. In particular, fastener 42 couples flange 80 of sensor housing 70 to electronics housing 36 in such a way that flange 80 is capable of movement relative to the electronics housing 36 along fastener 42 to allow positional adjustment of sensor assembly 38. Fastener 42 includes a head 88 that is carried in fastener head pocket 68 in rear wall 52 of electronics housing 36. Head 88 defines a tool recess 90 that is accessible through tool passage 56 from the exterior side 60 of rear wall 52. Tool recess 90 may have a shape that is complementary to the shape of a tool used to rotate fastener 42. In some embodiments, recess 90 may have a shape that defines one or more flats that engage corresponding flats on the tool. For example, recess 90 may have a polygonal shape such as a hexagonal shape configured to receive a hex key (Allen wrench). Recess 90 may alternatively be shaped to receive a screwdriver. Because fastener 42 is accessed and rotated through tool passage 56 in rear wall 52 of electronics housing 36, the position and orientation of sensor assembly 38 can be adjusted without affecting the environmental packaging of sensor device 34. Fastener 42 further includes a body 92 that extends away from head 88 and extends in a direction opposite the direction in which body 86 of fastener 40 extends away from head 84 of fastener 40. Body 92 is disposed about, and may be centered about, a fastener axis 94. Body 92 may be threaded and configured to engage mating internal threads formed in fastener passage 82 of upper end flange 80 in sensor housing 70. The threads may be formed directly in upper end flange 80 or in another fastener (e.g., a nut) supported within fastener passage 82 of upper end flange 80. During assembly, fastener 42 may be inserted into fastener passage 82 from one side of sensor assembly 38 and the combination of the sensor assembly 38 and fastener 42 inserted into electronics housing 36 such that the head 88 of fastener 42 is disposed within fastener head pocket 68. Thereafter, fastener 40 may be inserted into lower end flange 76 from an opposite side of sensor assembly 38 and into electronics housing 36 to secure flange 76 to housing 36. Rotation of fastener 42 about fastener axis 94 translates flange 80 of sensor housing 70 along body 92 of fastener 42 and fastener axis 94 to move flange 80 towards or away from rear wall 52 of electronics housing 36. Because sensor housing 70 is made from a material that has some level of flexibility, upper end flange 80 is able to move along body 92 of fastener 42 and fastener axis 94 despite the fixed position of lower end flange 76. Alternatively, or in addition, sensor housing 70 could be formed with a living hinge at the intersection of lower end flange 76 and body 78 of sensor housing 70 by removing or thinning the material between the lower end flange 76 and the body 78. Referring to FIGS. 9A-9B, because lower end flange 76 of sensor housing 70 is fixed to rear wall 52 of electronics housing 36, the movement of upper end flange 80 along fastener body 92 and fastener axis 94 changes the position and/or orientation of sensor assembly 38. As a result, an installer can adjust sensor assembly 38 to minimize or eliminate false positives that may result from reflection of electromagnetic waves by reflective surfaces near flushometer assembly 10. Although the illustrated embodiment results in movement of upper end flange 80 along a fastener 42 to change the position and/or orientation of sensor assembly 38, it should be understood that electronics housing 36 could alternatively be configured to fix upper end flange 80 to housing 36 and permit movement of lower end flange 76 along a fastener to change the position and/or orientation of sensor assembly 38.

Referring again to FIG. 5, controller 44 is provided to control movement of solenoid 32 in response to signals output by sensor device 34. Controller 44 may comprise a programmable microprocessor or an application specific integrated circuit (ASIC). Controller 44 may include a central processing unit (CPU) and an input/output (I/O) interface through which controller 44 may receive input signals including signals generated by sensor device 34 and generate output signals including those used to control solenoid 32. Controller 44 may be configured with executable instructions (i.e., software) to perform application specific analysis of inputs to and outputs from sensor device 34.

Potting material 46 is provided to limit or prevent movement of controller 44 within electronics housing 36 due to vibration and other forces (movement of controller 44 (and the printed circuit board supporting controller 44) is also limited by sensor assembly 38 through fastener 40). Material 44 may also prevent damage to controller 44 from fluids and corrosive elements. Material 46 is disposed within the interior of housing 36 and may be made from a silicon rubber gel or a thermosetting plastic or a self-healing potting gel. Material 44 may have a spring like or elastic characteristic such that material 44 biases sensor assembly 38 towards an original or default position proximate rear wall 52 of electronics housing 36 and thereby assists in returning sensor housing 70 to this position when fastener 42 is rotated in a direction that causes sensor assembly 38 to move towards rear wall 52 (tension in the bend of sensor housing 70 may also bias housing 70 to its original or default position).

Referring again to FIGS. 1-3, cover 16 is provided to protect the components of solenoid cap assembly 14 from foreign objects and elements and provide an aesthetically pleasing appearance to a user. Cover 16 may also provide support for one or more components of assembly 14 and position and orient components of assembly 14. Cover 16 may be made from metals such as zinc and metal alloys as well as plastics and may be secured to valve body 18 using conventional fasteners. Cover 16 is generally cylindrical in shape and defines a cavity configured to receive components of assembly 14. Cover 16 is closed at one end, but defines an opening at an opposite end to allow cover 16 to be installed over assembly 14. Cover 16 defines a window 96 in a side wall 98 that is configured for alignment with sensor assembly 38 upon assembly in order to allow transmission and reception of infrared light by sensor assembly 38. In some embodiments, cover 16 may also include a light energy collection device such as a solar cell in an end wall of cover 16 that is configured to transform light energy into electrical energy that can be used to charge power source 30. Conductors may extend from the device to power source 30.

A sensing device 34 in accordance with the present teachings is advantageous relative to conventional sensing devices because it enables fine adjustment of the position and/or orientation of sensor assembly 38. As a result, the sensor assembly 38 can be positioned and/or orientated to eliminate false positives resulting from reflection of emitted electromagnetic waves by reflective surfaces in the vicinity of the sensing device. Further, the adjustment can be done through a relatively simple process of rotating a fastener 42 that is easily accessible to an installer thereby promoting ease of installation and testing. Because the fastener 42 is accessed through a tool passage 56 in a rear wall 52 of electronics housing 36, the adjustment can also be made without disrupting the environmental packaging of housing 36.

While the invention has been shown and described with reference to one or more particular embodiments thereof, it will be understood by those of skill in the art that various changes and modifications can be made without departing from the spirit and scope of the invention.

We claim:

1. An adjustable plumbing fixture sensing device for detecting presence of an object, comprising:
   an electronics housing including a front wall and a rear wall, the rear wall including a tool passage therethrough extending from an interior side of the rear wall to an exterior side of the rear wall, and a fastener head pocket in communication with the tool passage on the interior side of the rear wall;
   a first fastener including a head carried in the fastener head pocket of the rear wall of the electronics housing and a body extending away from the head and establishing a fastener axis, wherein the head includes a tool recess accessible through the tool passage from the exterior side of the rear wall; and,
   a sensor assembly extending through the front wall of the electronics housing, and including a sensor housing having a first portion coupled to the rear wall of the electronics housing and a second portion carried on the body of the first fastener and configured for movement relative to the electronics housing along the body of the first fastener.

2. The sensing device of claim 1, further comprising a second fastener that couples the first portion of the sensor housing to the electronics housing, the second fastener including a head positioned against the first portion of the sensor housing and a body extending through first portion of the sensor housing and into the rear wall of the electronics housing.

3. The sensing device of claim 2 wherein the body of the first fastener extends from the head of the first fastener in a first direction and the body of the second fastener extends from the head of the second fastener in a second direction opposite the first direction.

4. The sensing device of claim 1 wherein the body of the first fastener is threaded and the second portion of the sensor housing has an internally threaded passage through which the body of the first fastener extends and wherein the first fastener is rotatable about the fastener axis so as to translate the second portion of the sensor housing along the body of the first fastener towards and away from the rear wall of the electronics housing.

5. The sensing device of claim 1 wherein the first portion of the sensor housing includes a lower end flange and the second portion of the sensor housing includes an upper end flange.

6. The sensing device of claim 5 wherein the sensor assembly includes an emitter proximate the upper end flange and a receiver proximate the lower end flange.

7. The sensing device of claim 1 wherein the sensor housing is made from a flexible material.

8. The sensing device of claim 7 wherein the sensor housing is made from an elastically deformable material.

9. The sensing device of claim 1 wherein the sensor housing defines a living hinge between the first portion of the sensor housing and a body of the sensor housing.

10. The sensing device of claim 1, further comprising a potting material disposed within the electronics housing and biasing the sensor housing towards the rear wall of the electronics housing.

11. An adjustable plumbing fixture sensing device for detecting presence of an object, comprising:
    an electronics housing including a front wall, and a rear wall and a sidewall extending away from the rear wall and establishing an interior, the rear wall including a tool passage therethrough extending from an interior side of the rear wall to an exterior side of the rear wall, and a fastener head pocket in communication with the tool passage on the interior side of the rear wall;
    a first fastener including a head carried in the fastener head pocket of the rear wall of the electronics housing and a threaded body extending away from the head and establishing a fastener axis, wherein the head includes a tool recess accessible through the tool passage from the exterior side of the rear wall; and,
    a sensor assembly extending through the front wall of the electronics housing, and carried in the interior of the electronics housing and including a sensor housing having a first portion fixed relative to the rear wall of the electronics housing and a second portion carried on the threaded body of the first fastener and configured for movement relative to the electronics housing along the threaded body of the first fastener.

12. The sensing device of claim 11, further comprising a second fastener that couples the first portion of the sensor housing to the electronics housing, the second fastener including a head positioned against the first portion of the sensor housing and a body extending through first portion of the sensor housing and into the rear wall of the electronics housing.

13. The sensing device of claim 11 wherein the second portion of the sensor housing has an internally threaded passage through which the body of the first fastener extends and wherein the first fastener is rotatable about the fastener axis so as to translate the second portion of the sensor housing along the body of the first fastener towards and away from the rear wall of the electronics housing.

14. The sensing device of claim 11 wherein the first portion of the sensor housing includes a lower end flange and the second portion of the sensor housing includes an upper end flange and the sensor assembly includes an emitter proximate the upper end flange and a receiver proximate the lower end flange.

15. The sensing device of claim 11 wherein the sensor housing is made from a flexible material.

16. The sensing device of claim 15 wherein the sensor housing is made from an elastically deformable material.

17. The sensing device of claim 11, further comprising a potting material disposed in the interior of the electronics housing and biasing the sensor housing towards the rear wall of the electronics housing.

18. A flushometer assembly, comprising:
 a valve body;
 a valve element disposed within the valve body;
 a solenoid configured to control a position of the valve element;
 an adjustable plumbing fixture sensing device for detecting presence of an object, and including
  an electronics housing including a front wall, a rear wall and a sidewall extending away from the rear wall and establishing an interior, the rear wall including a tool passage therethrough extending from an interior side of the rear wall to an exterior side of the rear wall, and a fastener head pocket in communication with the tool passage on the interior side of the rear wall;
  a fastener including a head carried in the fastener head pocket of the rear wall of the electronics housing and a threaded body extending away from the head and establishing a fastener axis wherein the head includes a tool recess accessible through the tool passage from the exterior side of the rear wall; and,
  a sensor assembly carried in the interior of the electronics housing and extending through the front wall of the electronics housing, and including a sensor housing having a first portion fixed relative to the rear wall of the electronics housing and a second portion carried on the threaded body of the fastener and configured for movement relative to the electronics housing along the threaded body of the fastener; and,
 a controller configured to control the solenoid responsive to an output signal of the sensor assembly.

19. The sensing device of claim 18, further comprising a second fastener that couples the first portion of the sensor housing to the electronics housing, the second fastener including a head positioned against the first portion of the sensor housing and a body extending through first portion of the sensor housing and into the rear wall of the electronics housing, wherein the body of the first fastener extends from the head of the first fastener in a first direction and the body of the second fastener extends from the head of the second fastener in a second direction opposite the first direction, wherein the body of the first fastener is threaded and the second portion of the sensor housing has an internally threaded passage through which the body of the first fastener extends and wherein the first fastener is rotatable about the fastener axis so as to translate the second portion of the sensor housing along the body of the first fastener towards and away from the rear wall of the electronics housing, wherein the first portion of the sensor housing includes a lower end flange and the second portion of the sensor housing includes an upper end flange, wherein the sensor assembly includes an emitter proximate the upper end flange and a receiver proximate the lower end flange, wherein the sensor housing is made from a flexible, elastically deformable, material.

20. The sensing device of claim 18, further comprising a potting material disposed within the electronics housing and biasing the sensor housing towards the rear wall of the electronics housing.

* * * * *